June 14, 1966 C. N. BRISTOL ETAL 3,256,503
APPARATUS FOR THE MANUFACTURE OF FLEXIBLE TUBES
OF RESIN-IMPREGNATED POROUS MATERIAL
Filed April 25, 1961 2 Sheets-Sheet 1
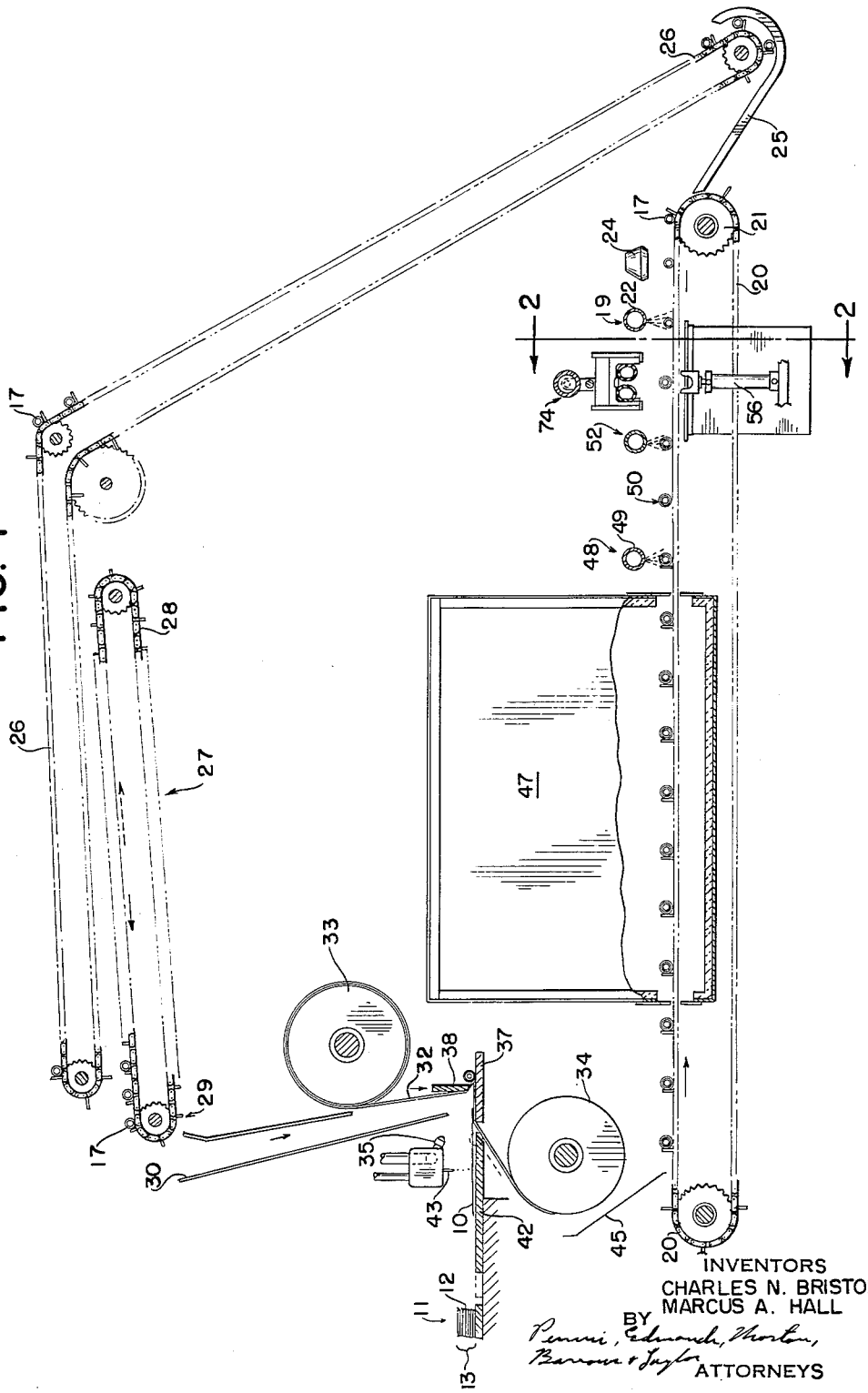
INVENTORS
CHARLES N. BRISTOL
MARCUS A. HALL
BY
ATTORNEYS

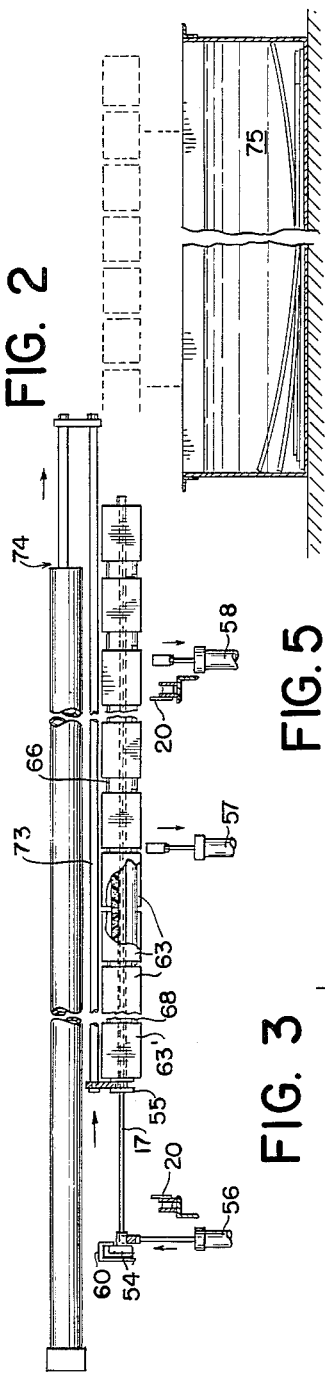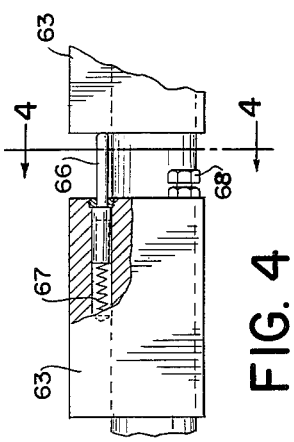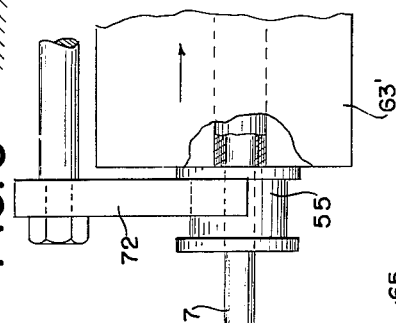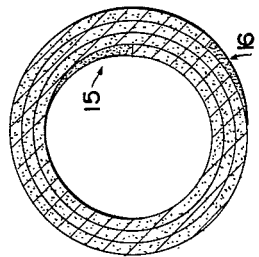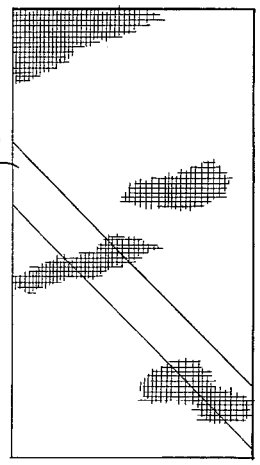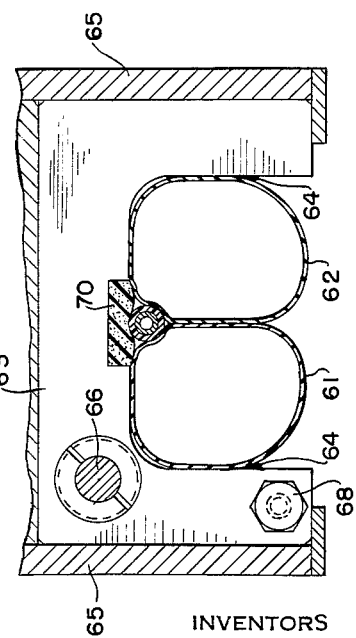

United States Patent Office 3,256,503
Patented June 14, 1966

3,256,503
APPARATUS FOR THE MANUFACTURE OF FLEXIBLE TUBES OF RESIN-IMPREGNATED POROUS MATERIAL
Charles N. Bristol, Essex, and Marcus A. Hall, Summer Island, Conn., assignors to The Flexible Tubing Corporation, a corporation of Connecticut
Filed Apr. 25, 1961, Ser. No. 105,400
4 Claims. (Cl. 156—449)

This invention relates to flexible tubes having a wall of resin-impregnated porous material and, more particularly, to a flexible tube formed from an elongated strip of resin-impregnated porous material rolled up longitudinally in a plurality of turns. The invention further provides a new apparatus for manufacturing this novel tube.

There are various designs of flexible tubing of rubber, plastic, resin-impregnated braid and so on which serve a wide range of functions, for example as conduits, protective sheaths or electrical insulators. The flexible tube of the present invention is an improved article of this type. In the electrical insulation of motor leads, for instance, no presently available small-diameter flexible tube combines sufficiently high dielectric strength with flexibility and mechanical strength to be completely satisfactory, yet each of these advantages is provided by this invention. Another use of this tubing is for a protective dielectric sheath about automobile aerials, and here too the new tube offers exceptional durability, resiliency and dielectric strength. Further application of the tube provided by this invention is in carrying pressurized fluids, since it can be made to provide excellent resistance to inner pressure and fluid leakage.

Broadly stated, the new flexible tube comprises an elongated strip of flexible porous material rolled up longitudinally in a plurality of turns. A resin impregnated in this strip is cured after the strip is rolled to form a unitary tubular element. Since the material of the tube depends upon its use, the porous material of the strip may be paper, fiber glass, cloth or any other material into which the resin can be impregnated, and the resin may be silicone, epoxy or one of a wide range of other polymers. In a more specific form, the new tube comprises a resin-impregnated elongated woven fabric strip rolled up longitudinally in a plurality of turns. Faired longitudinal deposits of the resin may be included at the two longitudinal edges of the strip extending respectively along the inner and outer surfaces of the roll. This resin is cured after the strip is rolled to form a unitary tubular element. The weave of the fabric may be on the bias with respect to the longitudinal axis of the tubular element, and the tubular element may be smoothly imprinted on both its inner and outer surfaces including the faired deposits of resin.

According to the new method of making flexible tubes provided by the invention, an elongated strip of resin-impregnated porous material is first rolled up longitudinally about an elongated mandrel. The next step is to cure the resin to form a unitary tubular element around the mandrel, and then the tubular element is stripped from the mandrel. In a more specific form of this method, the first step is to cut an elongated strip of resin-impregnated woven fabric with the weave thereof on the bias relative to the longitudinal axis of the strip. Additional resin is then deposited along the two longitudinal edges of the elongated strip. Next, the strip is rolled up longitudinally about an elongated hollow mandrel, and a containing sheet is wrapped closely about the rolled-up strip to smoothly imprint the outer surface of the resin-impregnated fabric and to fair the deposits of resin at the strip edges extending respectively along the inner and outer surfaces of the roll. The resin is then heat-cured to form a unitary tubular element around the mandrel and the tubular element is cooled from the inside of the hollow mandrel outwardly. Finally, the tubular element is stripped from the mandrel, and the containing sheet is removed from the tubular element.

The invention also includes apparatus for making flexible tubes from an elongated strip of resin-impregnated porous material. In general, this apparatus comprises an elongated mandrel, forming means for rolling the elongated strip longitudinally about the mandrel in a plurality of turns, an oven for heat-curing the resin in the rolled-up strip to form a unitary tubular element around the mandrel, and stripping means for removing the tubular element from the mandrel. In a more particular form, this apparatus comprises first a plurality of elongated mandrels. Secondly, it includes mandrel-handling means comprising a coating station for applying a fluid release agent to each mandrel successively, and a mandrel magazine in which the coated mandrels may be stored and from which they may be selectively fed. Thirdly, it includes forming means comprising a movable web, means for forming a substantially U-shaped loop in said web to receive each successive mandrel from the magazine transverse to the direction of movement from the web, and guiding means for directing the web closely around the greater part of the mandrel in the loop, whereby the elongated strip may be drawn between the web and the mandrel and rolled up longitudinally about the mandrel in a plurality of turns and an elongated containing sheet may be similarly rolled up around the strip. Next, it includes means for wetting the containing sheet prior to being rolled about the strip. Ejecting means are provided for removing each successive contained mandrel, and rolled-up strip from the web. An oven is included for heat-curing the resin in the rolled-up strip to form a unitary tubular element about the mandrel. Cooling means are provided for injecting a coolant through the hollow mandrel and over the containing sheet to cool the mandrel and unitary tubular element from the inside outwardly and from the outside inwardly. The apparatus further includes stripping means comprising a pair of opposed elongated inflatable stripping members, displacement means for placing each successive mandrel and tubular element between the gripping members, means for inflating the gripping members to hold the mandrel and tubular element therebetween, and means for moving the inflated gripping members and the tubular element held therebetween longitudinally off the end of the mandrel. Transfer means are provided in the apparatus for placing each successive stripped mandrel in the coating station. Lastly, means are included for removing the containing sheet from the stripped tubular element.

A preferred embodiment of the invention is described hereinbelow with reference to the accompanying drawings, wherein FIG. 1 is a schematic elevation of the new apparatus;

FIG. 2 is a section taken along the line 2—2 of FIG. 1 and showing the stripping means;

FIG. 3 is an enlarged fragmentary view partly broken away of adjacent slidable blocks on the stripping means;

FIG. 4 is an enlarged fragmentary section taken along the line 4—4 of FIG. 3;

FIG. 5 is an enlarged fragmentary view partly broken away showing the means for moving the gripping devices along the length of the mandrel;

FIG. 6 is an enlarged transverse section of a length of flexible tube according to the invention; and FIG. 7 is a plan view showing the preferred way of cutting a strip of resin-impregnated woven fabric for use in making the tube of FIG. 6.

The following discussion is concerned with a particular type of the new tube, namely a woven fiber glass fabric impregnated with silicone rubber, and with the apparatus and method employed in its manufacture, but it is to be understood that this choice is only for purposes of illustrating the invention.

In FIG. 7, an elongated strip 10 is shown cut at a forty-five degree angle from a section of woven fiber glass fabric impregnated with silicone rubber and covered with a protective slip sheet of polyethylene or the like. The purpose in cutting the strip 10 at an angle is to dispose the weave of the fabric on the bias relative to the longitudinal axis of the strip. Thus, the warp and filler of the fabric weave are both disposed at about forty-five degrees with respect to the strip edges. A number of the cut strips 10 may be piled one on top of the other to form a stack as shown at 11 in FIG. 1. For reasons explained below, relatively thick layers 12 and 13 of plain silicone rubber are spread over the opposite longitudinal sides of this stack 11 so that a deposit of silicone rubber is located on both edges of each strip 10.

Each of the strips 10 is rolled up longitudinally in a plurality of turns to form the tubular product shown in FIG. 6. The term "rolled up longitudinally" as herein used means that each strip 10 is curled up parallel to its longitudinal axis with little or no helical disposition of its longitudinal edges. After carrying out this rolling-up step, it is advantageous to contain the tube so that a smooth imprint is imparted to both its inside and outside surfaces and also so that the deposits of silicone rubber on the longitudinal edges of the strip are faired as shown at 15 and 16 respectively in FIG. 6. This seals the turns and smooths the faced-off edges of the strip, thereby providing more finished construction and pleasing appearance. The silicone rubber, both impregnating the fabric and faired at the strip edges, is then cured to form a unitary tubular element.

This product has high dielectric strength and is very well suited for motor lead insulation, aerial insulation, and the like. It has high mechanical strength and is quite flexible due to a great extent to the bias disposition of the fabric weave which allows uniform bending in any direction. It is also apparent that the new tube may be made in various sizes (even very small diameters) since its wall thickness is determined primarily by the number of turns in the rolled-up strip.

The method of making the tube shown in FIG. 6 is initiated by cutting the elongated strip of the silicone rubber-impregnated woven fiber glass as described with the weave thereof at an angle of about forty-five degrees relative to the longitudinal axis of the strip. Then, additional silicone rubber is deposited along the two longitudinal edges of the elongated strip 10, as for example by spreading the layers 12 and 13 on the stack 11 as described previously. Next, a release agent is applied to the outside surface of a hollow elongated mandrel. The strip 10 is then rolled up longitudinally about the mandrel, and a containing sheet is wrapped closely about the rolled-up strip. This smoothly imprints the outer surface of the resin-impregnated fabric and forces the inside against the mandrel to achieve the same smoothing effect there. In addition, this wrapping step fairs the deposits of silicone rubber at the strip edges extending respectively along the inner and outer surfaces of the roll.

After the form of the tube has been built-up about a mandrel in this manner, the silicone rubber is then heat-cured to form a unitary tubular element. This tubular element is cooled by directing a coolant through the hollow mandrel and also over the outside of the tubular element. Such cooling from the inside out aids considerably in the subsequent stripping of the mandrel, possible because it causes condensation from the resin to form on the surface of the mandrel thereby lubricating the interface between the tubular element and mandrel. The next step is to compress the tubular element carefully to expand its inside diameter. This is done to further aid in stripping, particularly if the weave of the fabric is on the bias. The mandrel is then stripped from the compressed tubular element and the containing sheet is removed, thereby producing the tube shown in FIG. 6.

Apparatus is also provided by the invention for carrying out the foregoing method of making the new tube. The first part of the machine to be described herein is the mandrel-handling means appearing in FIG. 1. The apparatus uses a plurality of mandrels 17 which are tubular and thus hollow and are advantageously of stainless steel. In a typical example, these mandrels may be about 67 inches long and from .109 to .750 inch in outside diameter. They are all seen on end in FIG. 1.

The mandrels are automatically recycled in the apparatus and thus their treatment begins immediately after they have been stripped from a previously formed length of tube. Accordingly, a coating station 19 is shown in FIG. 1 into which the mandrels are carried by a conveyor chain 20 driven by sprockets 21. At this station, each successive mandrel is covered with a release agent from a dispersing pipe 22. The conveyor 20 then indexes to bring each coated mandrel to a point beneath an infrared lamp 24 where the coating of release agent is dried quickly. From this heating or drying station, the coated mandrels drop successively into a rack 25 from which they are picked up by a transfer conveyor 26. This takes them up and over the apparatus in an incremental motion synchronized with the motion of the chain conveyor 20.

These mandrels which are coated and ready for use are stored in a mandrel magazine 27. This is an endless chain-type conveyor 28 which can be driven either forwardly (as shown by the solid-line arrow) or rearwardly (as shown by the dotted-line arrow). The magazine 27 is not driven in unison with the conveyors 26 and 20, but rather can be selectively operated on demand each time a new coated mandrel is required. Thus, its function is to store the mandrels arriving from the conveyor 26 and yet make them available quickly at its discharge end 29 for feeding into a chute 30. The conveyor 26 is positioned to deposit the mandrels in succession on the magazine 27 adjacent this discharge end 29 thereof, as shown in FIG. 1. Each time the magazine receives a mandrel from the conveyor 26, it automatically indexes rearwardly (in the direction of the dotted-line arrow) so that the storage of successive mandrels builds up in a direction away from the discharge end 29 of the magazine. Each time a new coated mandrel is required by the apparatus, the magazine 27 indexes forwardly (in the direction of the solid-line arrow) and one mandrel 17 is dropped off the discharge end 29 into the chute 30. By this construction, a mandrel is always available adjacent the discharge end of the magazine for immediate selective feed therefrom.

The new apparatus further includes forming means for rolling each elongated strip 10 of fabric longitudinally about one of the mandrels 17 in a plurality of turns. This includes a belt or web 32 (FIG. 1) advantageously of nylon impregnated with neoprene or polytetrafluoroethylene. The width of the web 32 is at least slightly greater than the length of each of the mandrels 17. Opposite end portions of the web 32 are secured to and wrapped about a pair of parallel drums or rollers 33 and 34. Each of these rollers is adapted to be driven, idled freely, or braked (perhaps magnetically) a controlled amount in an automatic fashion as described hereinbelow. Several air jets 35 are located in direct opposition to that portion of the web between the rollers 33 and 34 to blow air thereagainst. When they do so, the rollers 33 and 34 are operated such that the portion of the web therebetween is slack. Thus, the air from the jets 35 blows a substantially U-shaped loop of the slack portion of the web 32 under a vertically movable blade 38 (shown lowered in FIG. 1) and over a stationary table 37 therebeneath. At the same time, the mandrel magazine 27 indexes forwardly automatically to discharge a coated mandrel 17 into the feed chute 30. This mandrel falls onto the web and is blown by the air from the jets 35 into the loop or pocket behind the blade 38. The blade 38 is then lowered and the air from the jets 35 is shut off, leaving the mandrel 17 behind the blade 38 and within the loop of the web 32 (as shown in FIG. 1).

The lower edge of the blade 38 pinches (without binding) the neck of the loop of the fabric 32 to direct it around as much of the circumference of the mandrel 17 as possible, and the roller 33 is then driven in a clockwise direction as shown in FIG. 1 to take in the slack of the web 32 between the rollers.

Meanwhile, the operator peels the uppermost strip 10 from the stack 11 thereof and lays it on the forward edge of a horizontally movable table 42 extending alongside the stationary table 37 which is behind the web 32. The movable table 42 at this time is in its forward position shown in the solid lines in FIG. 1 such that its forward edge is closely adjacent that portion of the web 32 extending between the upper surface of the stationary table 37 and the roller 34. The operator strips the polyethylene slip sheet from the individual strip 10 and the forward edge of the silicone fiber glass strip adheres slightly to the neoprene of the web 32. The slip sheet is discarded and the operator then actuates the roller 33 in a clockwise direction as shown in FIG. 1. This translates the web 32 over the stationary table 37 around the mandrel 17 (which rotates freely) and under the blade 38. Also, it pulls the strip 10 onto the web 32 and carries it around the mandrel 17. The strip 10 stays with the mandrel 17 and leaves the web, however, at the point where the web heads under the blade 38, so that at least one layer of the strip is wrapped about the mandrel. During this winding, the roller 34 is under controlled bracking to apply the proper tension to the web.

There is an automatic pause in the middle of this wrapping cycle at which time the operator lays an elongated sheet of cellophane, similar in shape to the sheet 10 though narrower, on the movable table 42 at the trailing edge of the sheet 10. This cellophane is the containing sheet which pressure-wraps the rolled-up strip 10 as described previously. During the pause, a quick jet of water sprays from jets 43 (advantageously horizontally disposed hypodermic needles) onto the cellophane before it is wrapped to render it adhesive to itself. As soon as the water spray stops, the web 32 starts automatically and rolls the remainder of the strip 10 around the mandrel followed by the cellophane containing sheet. The width of the containing sheet is such that it overlaps slightly and sticks to itself to hold the rolled-up sheet 10 therewithin. This smoothly imprints the rolled-up sheet and the faired deposits 15 and 16 if silicone on both the inside and outside surfaces thereof.

Upon completion of this rolled-up cycle, the movable table 42 moves outwardly to the left as shown in FIG. 1 to the dotted-line position. This leaves a gap between the forward edge of the movable table 42 and that portion of the web extending from the stationary table 37 to the roller 34. As soon as the movable table 42 moves rearwardly, the blade 38 rises automatically and the web 32 is driven in a counterclockwise direction as shown in FIG. 1 while the roller 33 is maintained under controlled braking. This takes up the slack in the web 32 between the rolls 33 and 34 and pulls what had been the U-shaped loop out of the web. The mandrel 17 and its tubular element are thereby ejected forwardly as the U-shaped loop is pulled in and they slide through the gap opened by the movable table 42 and onto the conveyor 20 therebeneath (perhaps aided by a chute 45). Upon ejectment of the mandrel in this manner, the roller 34 is braked while the roller 33 is driven clockwise to rewind the web 32. Thereupon, a new mandrel is released from the magazine 27 and the cycle is repeated.

After being deposited on the chain conveyor 20, each successive mandrel and tubular element is carried into an oven 47. The conveyor 20 moves incrementally, perhaps three inches at a time, at sufficiently timed intervals to achieve the desired duration of heat-curing in the oven of the silicone rubber in the tubular element. This heats the tubular element into a unitary structure and gives it the desired strength and flexibility.

As each cured tubular element and mandrel emerges from the oven 47, it moves into a cooling station 48. Two cooling functions are carried out there, namely an injection of water or other coolant from a jet (not visible behind the end of the mandrel in FIG. 1) through the inside of the hollow mandrel and a drenching of water from an overhead pipe 49 about the outside of the tubular element disposed around the mandrel. Not only does this cool the mandrel and tubular element from the high temperature to which it was elevated in the oven, but the cooling of the tubular element from the inside out also aids in stripping the mandrel. It is believed that the sudden cooling from the inside causes a condensate to form at the interface between the mandrel and the tubular element, thereby lubricating the tubular element when the mandrel is stripped therefrom. A further function carried out at the cooling station 48 is to soften the cellophane container sheet which usually becomes highly brittle during passage through the oven 47.

After leaving the cooling station 48, each successive mandrel and tubular element passes to a station 50 where an air jet (again, not visible behind the end of the mandrel) blows any residual moisture out of the mandrel bore. From there, the mandrel and tubular element pass to a second and final cooling station 52 where they are against drenched exteriorly with water in preparation for the stripping process.

The stripping means is described with reference to FIG. 1 and FIGS. 2–5. It is to be noted that each mandrel includes a rigidly attached knob or head 54 (FIG. 2) at one end thereof and a spool-like slide 55 normally positioned immediately adjacent the head 54. The opposite end of the mandrel 17 is free of any such elements. When each mandrel and tubular element enters the stripping means, it stops over three jacks 56, 57, and 58 at the head, end, middle and far end respectively of the mandrel. (Only the head end jack 56 appears in FIG. 1, but all three are visible in FIG. 2.) These three jacks rise together to lift the mandrel and tubular element from the conveyor 20 into the elevated position shown in FIG. 2.

In this elevated position, the head 54 enters a yoke 60 which locks the mandrel against any longitudinal movement. The elongated body of the mandrel 17 is then in position between elongated inflatable squeezing or gripping members 61 and 62 (advantageously of neoprene coated nylon) which are deflated and parallel to one another and spaced apart throughout their length. These inflatable members are supported at closely spaced points along their length by a plurality of aligned channel-like blocks 63 to which they are glued at 64 (FIG. 4). These spaced blocks 63 in turn are mounted in stationary ways 65 which are part of the frame of the apparatus.

When the mandrel is first raised to its elevated position shown in FIG. 2, the block 63 are all spaced equally apart with the first block 63' closely adjacent the head 54 on the mandrel (in FIG. 2, this first block 63' is shown removed from this initial position). It is to be understood that the inflatable members 61 and 62 extend from block-to-block. The blocks 63 are held apart at their proper initial spacing by slidably mounted pins 66 which are urged outwardly by respective compression springs 67. By this construction, the blocks may be brought together resiliently in an accumulative manner, and the closest spacing permissible is controlled by an adjustable screw 68 on each block adapted to abut the adjoining block.

When the three jacks 56, 57, and 58 raise the mandrel up into the block 63 between the inflatable gripping members 61 and 62, the tubular element about the mandrel rests against sponge rubber pads 70 (FIG. 4) within the respective blocks 63. The gripping members 61 and 62 are then automatically inflated at a low pressure, for example 5 p.s.i., to compress themselves against the cellophane containing sheet surrounding the tubular element on the mandrel. The middle jack 57 and the far end jack 58 then are pulled downwardly and easily slip out from between the low-pressure inflated gripping members. This leaves the tubular member and mandrel held substantially throughout its length by the gripping members 61 and 62.

Next, the spool-like slide 55 on the mandrel 17 is moved toward the free end of the mandrel (to the left as seen in FIG. 2) by means of a yoke 72 into which the slide 55 seats when the mandrel is first raised into elevated position. The yoke 72 is supported on a rod 73 which is longitudinally movable by means of an air cylinder and piston 74. Thus, as soon as the tubular element and the mandrel are held by the gripping members 61 and 62, the piston 74 moves the rod 73 to the right as shown in FIG. 2, thereby causing the slide 55 to about the first block 63' as shown in FIG. 5. As the slide 55 is moved further to the right, the blocks come into contact at their adjustment screws 68 one after another by depression of their respective resiliently mounted pins 66. In FIG. 2, the apparatus appears during the first stage of this block-engaging process.

The effect of the blocks 63 coming together in this fashion is to compress the inflated gripping members 61 and 62 axially, and this can easily be done because of their low pressure and flexible construction. In addition, the axial compression of the gripping members 61 and 62 causes a similar axial compression of the tubular element disposed about the mandrel 17. (Since the impregnated fabric wall of the tubular element is flexible and resilient, it compresses naturally to a certain extent; the bias disposition of the fabric weave greatly enhances this compression of the tubular element and in addition causes the inside diameter of the tubular element to increase to aid in separation from the mandrel.) After all the blocks are brought into engagement, the slide 55 continues to move toward the free end of the mandrel to strip the compressed tubular element from the mandrel. It will be noted that as soon as the slide 55 passes the middle jack 57 that middle jack rises automatically to support the stripped mandrel 17; similarly, the far end jack 58 rises after the slide 55 moves by to support the outer end of the mandrel 17.

At the maximum extension of the air piston 74, the slide 55 is just short of the free end of the mandrel 17 and the entire length of the compressed stripping members 61 and 62 are located off to the side as shown at the right in dotted lines in FIG. 2. At this point, the tubular element is entirely free of the mandrel 17. Then, the inflatable gripping members 61 and 62 are deflated (preferably under a vacuum) to free the tubular element and cause it to drop out of the closed-up blocks 63 into a tank of water 75 located therebeneath. In the tank 75, the water tends to soften the cellophane container sheet surrounding each finished tube so that it can easily be stripped away. As soon as the tubular elements are free of the blocks, the air piston 74 moves the slide 55 back towards the head-end of the mandrel to the left as seen in FIG. 2, and the blocks spring apart by their resilient pins 66 into their original spacing. The three raised jacks 56, 57, and 58 are lowered to return the stripped mandrel 17 to the conveyor 20 and the conveyor indexes the mandrel forwardly. The next station is the coating station where the stripped mandrel is prepared for reuse as described hereinbefore.

In the foregoing discussion for the new apparatus, the automatic control system for synchronizing the various operations in the machine are neither shown in the drawings nor described in detail since any suitable control system suffices. Advantageously, however, the control system is such that substantially all of the foregoing steps are carried out automatically with perhaps the exception of laying the fabric strip and cellophane on the table at the beginning of the cycle.

We claim:

1. Apparatus for making a flexible tube from an elongated strip of resin-impregnated porous material comprising an elongated hollow mandrel; forming means for rolling said elongated strip longitudinally about said mandrel in a plurality of turns; an oven for heat-curing the resin in the rolled-up strip to form a unitary tubular element about said mandrel; cooling means for injecting a coolant through said hollow mandrel to cool said mandrel and unitary tubular element from the inside outwardly; and stripping means for removing said tubular element from said mandrel.

2. Apparatus for making a flexible tube from an elongated strip of resin-impregnated porous material comprising an elongated mandrel; forming means for rolling said elongated strip longitudinally about said mandrel in a plurality of turns; an oven for heat-curing the resin in the rolled-up strip to form a unitary tubular element about said mandrel; and mandrel stripping means comprising a pair of opposed elongated resilient fluid-inflatable gripping members, displacement means for placing the mandrel and tubular element between said gripping members, means for inflating said gripping members to hold said tubular element substantially throughout its length, and means for moving the inflated gripping members and the tubular element held therebetween longitudinally off the end of said mandrel.

3. Apparatus for making a flexible tube from an elongated strip of resin-impregnated porous material comprising an elongated mandrel; forming means for rolling said elongated strip longitudinally about said mandrel in a plurality of turns; an oven for heat-curing the resin in the rolled-up strip to form a unitary tubular element about said mandrel; and mandrel stripping means comprising a pair of opposed elongated resilient fluid-inflatable gripping members, displacement means for placing the mandrel and tubular element between said gripping members, means for inflating said gripping members to hold said mandrel and tubular element therebetween, means for axially compressing the inflated gripping members and the tubular element held therebetween, and means for moving the inflated axially compressed gripping members and the tubular element held therebetween longitudinally off the end of said mandrel.

4. Apparatus for making a flexible tube from an elongated strip of resin-impregnated porous material comprising an elongated mandrel; forming means for rolling said elongated strip longitudinally about said mandrel in a plurality of turns; an oven for heat-curing the resin in the rolled-up strip to form a unitary tubular element about said mandrel; and mandrel stripping means comprising a pair of opposed elongated inflatable axially compressible pneumatic gripping members; jacks for lifting the mandrel and tubular element between said gripping members, means for inflating said gripping members to hold said mandrel and tubular element therebetween, means for axially compressing the inflated gripping members and the tubular element held therebetween, means for moving the inflated axially compressed gripping members and the tubular element held therebetween longitudinally off the end of said mandrel, and means for deflating said gripping members to release said tubular element.

References Cited by the Examiner
UNITED STATES PATENTS

| | | | |
|---|---|---|---|
| 1,472,435 | 10/1923 | Palmer | 138—129 |
| 1,921,516 | 8/1933 | Frederick | 156—446 |
| 2,259,959 | 10/1941 | Miller | 93—81 |
| 2,424,540 | 7/1947 | Bogoslowsky | 93—81 |
| 2,593,835 | 4/1952 | Biggert et al. | 156—457 |
| 2,649,133 | 8/1953 | Just | 156—446 |
| 2,669,258 | 2/1954 | Spitz | 138—129 |
| 2,828,798 | 4/1958 | Hopkins et al. | 156—187 |
| 2,949,149 | 8/1960 | Strickland | 156—425 |
| 2,978,005 | 4/1961 | Park | 156—425 |
| 3,005,742 | 10/1961 | Kennedy | 156—187 |
| 3,063,887 | 11/1962 | Labino | 156—446 |

EARL M. BERGERT, *Primary Examiner.*

EDWARD V. BENHAM, *Examiner.*

L. G. FOSTER, R. J. CARLSON, R. H. CRISS,
*Assistant Examiners.*